(12) United States Patent
He et al.

(10) Patent No.: US 7,403,593 B1
(45) Date of Patent: Jul. 22, 2008

(54) HYBRID X-RAY MIRRORS

(75) Inventors: Bob Baoping He, Madison, WI (US);
Roger D. Durst, Middleton, WI (US)

(73) Assignee: Bruker AXS, Inc., Madison, WI (US)

( * ) Notice: Subject to any disclaimer, the term of this patent is extended or adjusted under 35 U.S.C. 154(b) by 337 days.

(21) Appl. No.: 11/237,645

(22) Filed: Sep. 28, 2005

Related U.S. Application Data

(60) Provisional application No. 60/613,734, filed on Sep. 28, 2004.

(51) Int. Cl.
*G21K 1/06* (2006.01)
*G21N 23/20* (2006.01)

(52) U.S. Cl. .............................. 378/85; 378/84; 378/70

(58) Field of Classification Search .................. 378/70, 378/82, 84, 85, 119, 145; 250/505.1, 505.112
See application file for complete search history.

(56) References Cited

U.S. PATENT DOCUMENTS

| | | | |
|---|---|---|---|
| 5,454,021 A * | 9/1995 | Nakajima et al. | 378/84 |
| 6,724,858 B2 * | 4/2004 | Holz | 378/85 |
| 2002/0064253 A1 * | 5/2002 | Gutman | 378/84 |
| 2003/0128811 A1 * | 7/2003 | Verman et al. | 378/84 |

* cited by examiner

*Primary Examiner*—Irakli Kiknadze
(74) *Attorney, Agent, or Firm*—Law of Offices Paul E. Kudirka

(57) ABSTRACT

An x-ray mirror provides focusing and monochromatization while maintaining a high degree of reflectivity. The mirror has at least two mirror portions, one with a multilayer surface that provides the desired monochromating, and the other with a total external reflection surface. The multiple surfaces combine to provide the desired focusing of the x-rays from a source to a focus point. A variety of configurations may be used, each of which does the desired focusing and monochromatization with minimal energy loss. Relative positioning of the mirror portions may also allow for adjustment of the focus length.

20 Claims, 4 Drawing Sheets

HYBRID X-RAY MIRRORS

CROSS-REFERENCE TO RELATED APPLICATIONS

This application takes priority from U.S. Provisional Patent Application Ser. No. 60/613,734, filed Sep. 28, 2004.

FIELD OF THE INVENTION

This invention relates generally to the field of x-ray diffraction analysis and, more particularly, to the imaging of an x-ray beam with a structure that provides both focusing and monochromating of the beam.

BACKGROUND OF THE INVENTION

In an x-ray diffraction system the function of x-ray optics is to condition the primary x-ray beam into the required wavelength, beam focus size, beam profile and divergence. One type of x-ray optics device is the total external reflection mirror. Total external reflection happens when x-rays strike on a polished surface at a small grazing incident angle. The reflected x-rays from the surface take off at the same angle as the incident angle. The polished surface behaves similarly to a mirror reflecting visible light. Therefore such a mirror is referred as an x-ray mirror. The reflecting mirror is made of materials with refractive index less than unity. The total external reflection can only be observed at an incident angle less than the critical incident angle $\theta_C$. The value of the critical angle is dependent on the wavelength of the x-ray radiation and the reflecting materials. For a typical laboratory x-ray source, the wavelength is in the range of a fraction of nanometer, and the critical angle is in the range of a fraction of a degree to several degrees.

Another type of x-ray optics device is the multilayer mirror. A multilayer mirror consists of alternating layers of heavy materials as reflection layers and light materials as spacer layers. A multilayer mirror works on the same principle as Bragg diffraction from a natural crystal, selectively reflecting certain wavelengths based on the spacing between the mirror layers. In this way, multilayer mirrors can be used as monochromators. In contrast to a natural crystal, a multilayer mirror typically has larger d-spacing so that the incident angle and the diffracted angle are typically only a few degrees. In these mirrors, the number of layers, the d-spacing of the layers, and the distribution of the layer thickness can be varied to modify the mirror performance.

SUMMARY OF THE INVENTION

In accordance with the present invention, a hybrid mirror for x-ray diffraction systems is provided that provides monochromatization, but maintains a higher overall reflectivity than conventional multilayer mirrors. The hybrid mirror can take a number of different forms, but in each case includes a multilayer mirror portion and a total external reflection mirror portion. The multilayer mirror portion provides the desired monochromatization and, together, the multilayer mirror portion and the total external reflection mirror portion provide the desired focusing of the x-ray energy, which may originate at substantially a point source, toward a focal point.

In one embodiment, the mirror uses two mirror surfaces side-by-side, one surface being a multilayer material and the other being a total external reflection material. In another embodiment, the multilayer mirror portion and the total reflection mirror portion are arranged in a Kirkpatrick-Baez configuration. In still another embodiment, a side-by-side single bounce mirror component is coupled with a double side reflection mirror component, where one of the components comprises a multilayer, while the other comprises a total reflection material. In a different embodiment, the multilayer mirror portion and the total external reflection portion are located on two partially cylindrical surfaces that lie opposite each other. One partially cylindrical portion has its reflective surface on an inner surface that faces a reflective outer surface of the other partially cylindrical portion, which lies adjacent to it. Still another embodiment uses double cross-coupled hybrid mirror sections, that is, two side-by-side mirror sections, one a multilayer and the other a total reflection material. Yet another embodiment of the invention is configured so that one mirror surface completely encompasses another mirror surface circumferentially. On the outer portion is an inner surface that faces an outer surface of the inner portion. One of these surfaces comprises a multilayer while the other comprises a total reflection surface.

BRIEF DESCRIPTION OF THE DRAWINGS

The above and further advantages of the invention may be better understood by referring to the following description in conjunction with the accompanying drawings in which.

DETAILED DESCRIPTION

Figure 1:
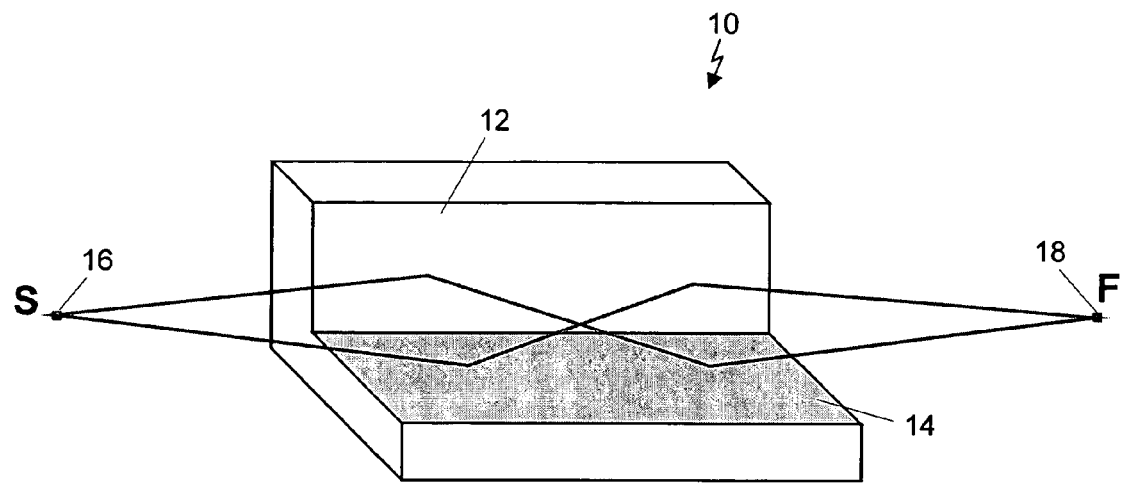
FIG. 1 is a schematic view of an embodiment of the present invention in which two mirror surfaces are side-by-side.

Shown in FIG. 1 is a hybrid mirror 10 according to a first embodiment of the invention. The mirror 10 includes a total reflection portion 12 and a multilayer portion 14. The x-ray radiation energy from x-ray source 16 diverges toward both portions of the mirror. Part of the x-ray energy is first reflected by the total external reflection portion 12 and then reflected by the multilayer mirror portion before reaching a focus point 18. Similarly, another part of the x-ray radiation energy from the same x-ray source 16 is first reflected by the multilayer portion 12 and then reflected by the total external reflection portion en route to the same focus point 18. Thus, all of the x-ray energy from the source is reflected by the total external reflection mirror once and by the multilayer portion once. All of the initial x-ray beam is therefore monochromatized by the multilayer portion prior to reaching focus point 18. However, compared to conventional side-by-side multilayer mirrors, the output x-ray beam from this device has a higher intensity, since the high reflectively portion is relatively low loss. In this embodiment, both mirror portions in the hybrid mirror may be either flat or curved depending on the desired performance. Various curved shapes and multilayer features available to the existing multilayer mirrors and total reflection mirrors are applicable to this hybrid mirror.

Figure 2:
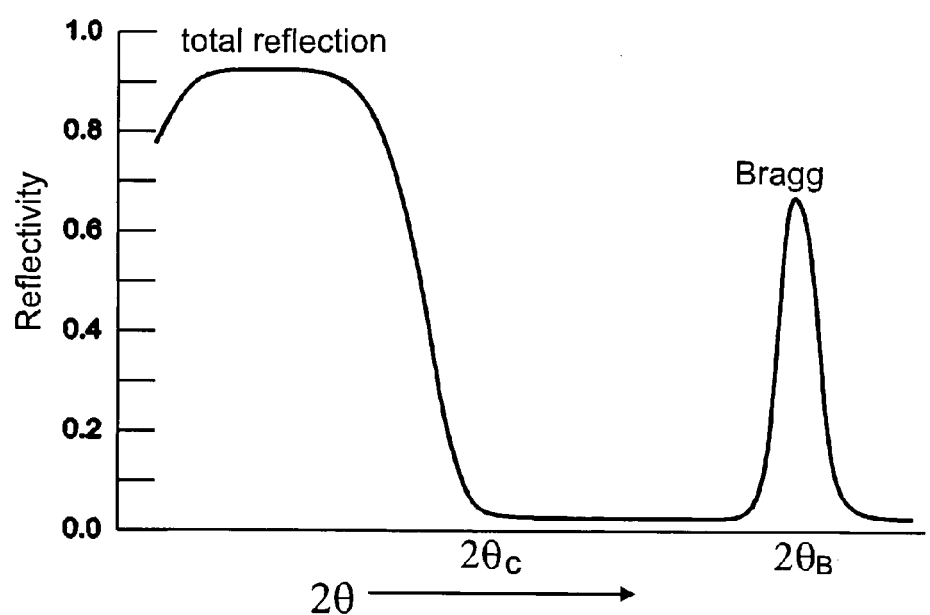
FIG. 2 is a graphical view showing the general reflectivity characteristics of multilayer mirror surfaces and total external reflection surfaces.

FIG. 2 is an illustration showing the relation between reflectivity and 2θ angles for the total external reflection portion and the multilayer portion of the hybrid mirror 10. The use of 2θ as a measurement is commonplace in x-ray diffraction analysis, where the resulting direction of a reflected or refracted x-ray beam is twice the angle of incidence θ. In FIG. 2, $θ_C$ is the critical angle for total external reflection, that is, the maximum incident angle that allows total external reflection. It depends on the reflection material and the energy (or wavelength) of the radiation. $θ_B$ is the Bragg angle of the multilayer mirror which depends on the d-spacing of the multilayer. The reflectivity of a typical total reflection surface is better than 90%, while the reflectivity of a multilayer surface is typically lower, 70% for instance. The graph in FIG. 2 also indicates the wavelength selectivity of the multilayer surface as compared to the total reflection surface.

In a double bounce mirror, the overall reflectivity is a multiple of the first bounce and the second bounce. For the hybrid mirror shown in FIG. 1, in which x-rays encounter the multilayer portion and the total reflection portion, the overall reflectivity $R_{OH}$ can be given as:

$$R_{OH} = R_T \cdot R_M$$

where $R_T$ is the reflectivity of the total reflection portion and $R_M$ is the reflectivity of the multilayer portion. For a conventional side-by-side multilayer mirrors, x-rays are bounced twice by multilayer mirrors, so the overall reflectivity $R_{OC}$ can be given as:

$$R_{OC} = R_M \cdot R_M$$

Because of the relative higher reflectivity from a total reflection mirror:

$$R_T > R_M, \text{ or}$$

$$R_{OH} > R_{OC}$$

The intensity gain with the hybrid mirror relative to a side-by-side multilayer mirror is therefore $R_T/R_M$.

Figure 3:
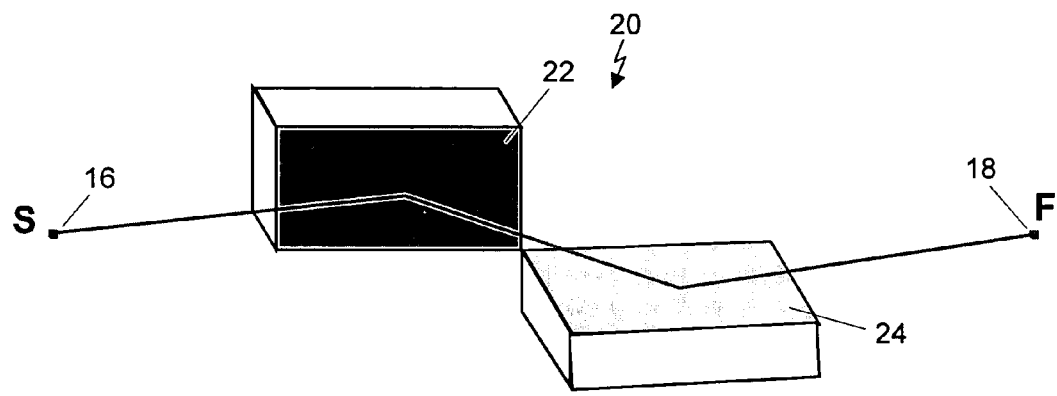
FIG. 3 is a schematic view of an embodiment of the present invention in which two mirror surfaces are arranged in a Kirkpatrick-Baez configuration.

FIG. 3 shows another embodiment of a hybrid mirror 20 according to the present invention. In this embodiment, two mirror portions are arranged in a so-called "Kirpatrick-Baez" configuration. x-rays from a source 16 are bounced by a multilayer portion 22 and then bounced by a total reflection portion 24 further down in the beam path. The surface of the total reflection portion 24 is rotated 90 degrees relative to the multilayer portion 22. This arrangement may also use the two mirror portions in a reverse configuration, where the total reflection portion is upstream from the multilayer portion in the beam path.

Figure 4:
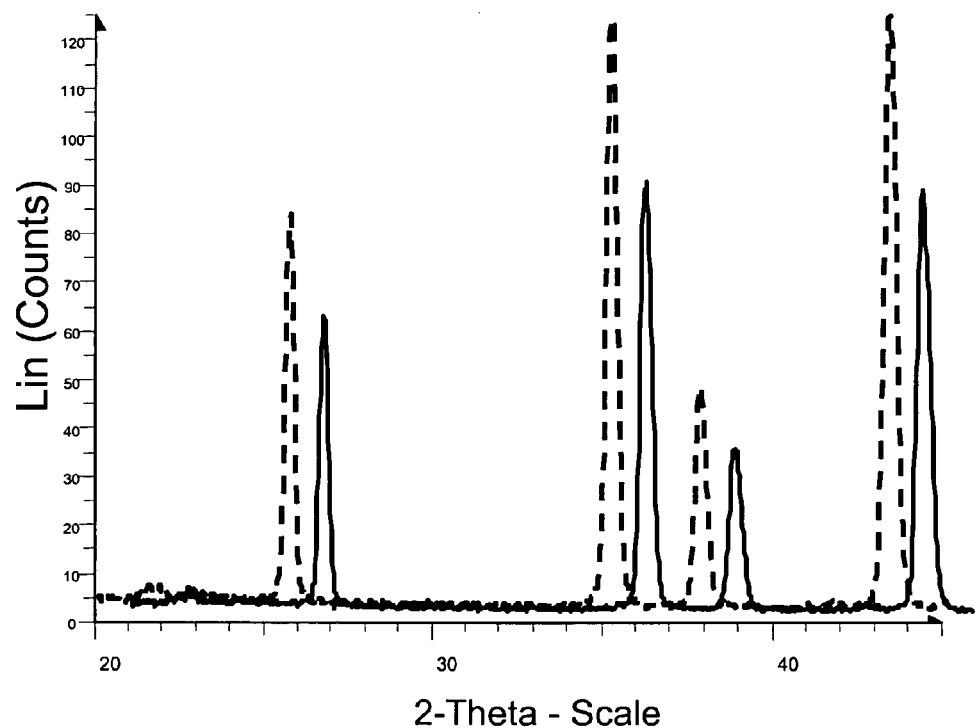
FIG. 4 is a graphical view showing the experimental reflectivity difference between a conventional multilayer mirror and a hybrid mirror according to the present invention.

The reflectivity of the mirror group in a Kirpatrick-Baez configuration can also be calculated in the manner described above. FIG. 4 is an experimental result comparing hybrid mirrors according to the present invention (for which the peaks are shown in broken lines) and conventional multilayer mirrors (for which the peaks are shown in solid lines), each in a Kirpatrick-Baez configuration. The diffraction peaks with multilayer mirrors are shifted to the right for easy comparison. As shown in FIG. 4, the hybrid mirrors have intensity gains of 38% to 42% relative to multilayer mirrors in a Kirpatrick-Baez configuration. The side-by-side hybrid mirrors should have about the same intensity gain advantage.

Figure 5:
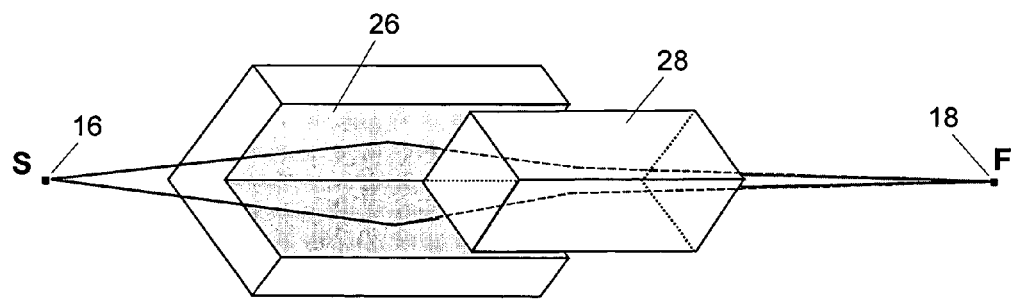
FIG. 5 is a schematic view showing an embodiment of the invention in which a side-by-side single bounce mirror component is coupled with a double side reflection mirror component.

FIG. 5 shows another embodiment of the present invention, in which a side-by-side single bounce mirror 26 is coupled with a double side reflection mirror 28. The two adjacent sides of the mirror 26 are multilayer surfaces. The two adjacent sides of the mirror 28, however, are total external reflection surfaces. A part of the x-ray radiation energy from the x-ray source 16 is first reflected by side-by-side mirror 26, and then reflected by the double side reflection mirror 28 to reach the focus 18. The mirrors 26 and 28 face each other. Another part of the x-ray radiation energy from the same x-ray source 16 is first reflected by the double side reflection mirror 28, and then reflected by the side-by-side mirror 26 to reach the same focus 18. Both parts of the x-rays are reflected by both multilayer surfaces and by total external reflection surfaces.

In the embodiment of FIG. 5, the position of the block 28 with the two side reflection mirrors can be adjusted to change the focus distance between the hybrid mirrors and the focus spot 18. The block can also function as a beamstop to prevent the unconditioned x-rays from the source 16 from reaching the focus 18. Those skilled in the art will also recognize that, as with the aforementioned embodiments, the relative position of the multilayer surfaces and the total reflection surfaces may be reversed.

Figure 6:
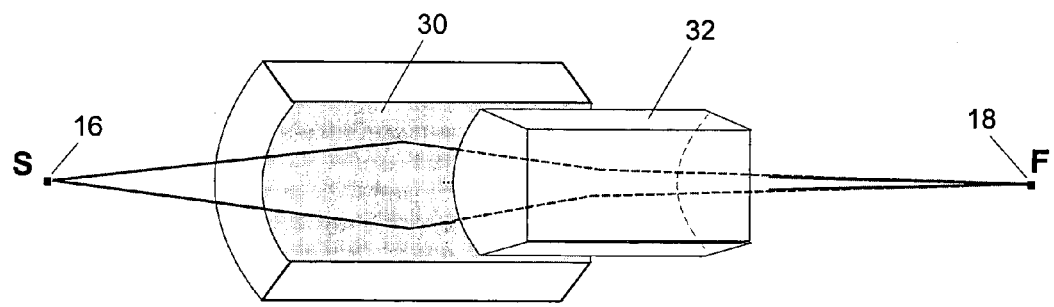
FIG. 6 is a schematic view of an embodiment of the invention in which two mirror surfaces are opposing partially cylindrical surfaces.

FIG. 6 shows still another embodiment of the present invention, in which a configuration of partially cylindrical surfaces is used. This configuration is a variation from the face-by-face surfaces discussed above. Instead of two side-by-side surfaces for each mirror section, a single curved surface is used for each. In the configuration shown in FIG. 6, an outer partially cylindrical mirror portion 30 may have a concave multilayer mirror surface. An adjacent, inner partially cylindrical mirror portion 32 may have a convex total external reflection surface facing the mirror portion 30. The x-ray radiation energy from the x-ray source 16 is first reflected by the multilayer mirror portion 30, and then reflected by the total external reflection mirror portion 32 to reach the focus 18. The convex mirror portion 30 may be tilted to allow for a variable focus distance. Meanwhile, the convex mirror 32 may act as a beam stop, blocking the direct x-ray energy from reaching the focus 18.

Figure 7:
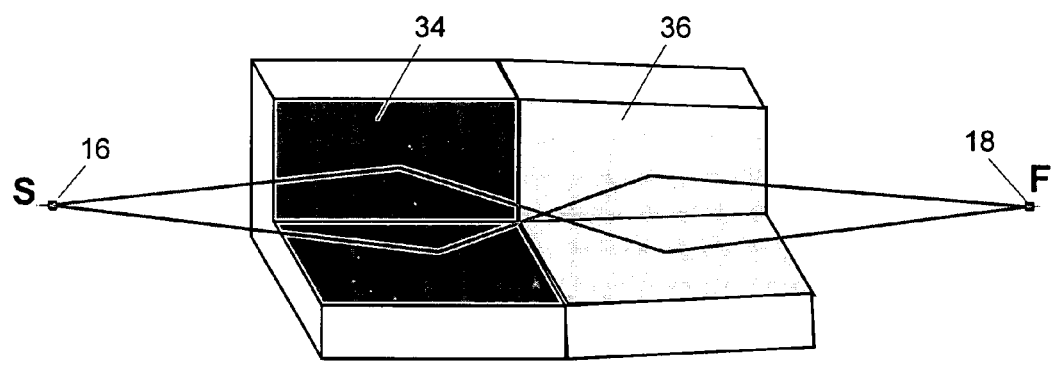
FIG. 7 is a schematic view of an embodiment of the invention that uses double cross-coupled hybrid mirror sections.

FIG. 7 shows an embodiment that uses a configuration of double cross-coupled hybrid mirror portions. This configuration is a variation of the aforementioned hybrid mirrors that use a Kirpatrick-Baez arrangement. Instead of using a single surface for each mirror surface of a given section, a side-by-side multilayer mirror portion 34 is coupled with a side-by-side total external reflection mirror portion 36. The x-ray radiation energy from the x-ray source 16 is first reflected by the multilayer mirror portion and then reflected by the total external reflection mirror portion to reach the focus 18. The total external reflection mirror portion 36 may be tilted relative to the multilayer mirror portion 34 to allow the focus distance to be varied.

Figure 8:
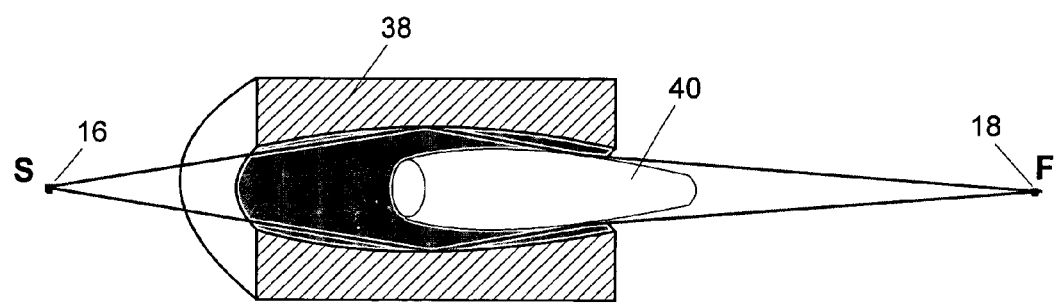
FIG. 8 is a schematic view of an embodiment of the invention in which one mirror surface circumferentially encompasses another mirror surface.

FIG. 8 shows yet another embodiment of the present invention. In this configuration, two mirror portions are used that are arranged with one encompassing the other. This configuration is a variation of the aforementioned coupled partial cylinder hybrid mirrors, but instead of a partially cylindrical surface for each mirror portion, fully circumferential surfaces are used. An outer mirror portion 38 has an inner surface that is a multilayer mirror surface. Although this mirror portion 38 is shown in cross-section in the figure, those skilled in the art will recognize that it fully encompasses the inner portion 40.

The inner mirror portion 40 has an outer surface that is a total external reflection mirror surface. The outer mirror portion 38 and the inner mirror portion 40 have a common longitudinal axis. The x-ray radiation energy from x-ray source 16 is first reflected by the multilayer mirror surface of the outer portion 38, and then reflected by the total external reflection mirror surface of the inner mirror portion 40, so as to reach the focus 18. The total external reflection mirror surface of the inner portion reduces the divergence of the x-rays by reflecting them to a longer focus distance. The inner portion 38 may also be moved along the common longitudinal axis relative to the outer portion so as to vary the focus distance. As with each of the embodiments herein, the relative position of the multilayer mirror surface and the total external reflection surface may be reversed.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. An x-ray optical apparatus for conditioning an x-ray beam, the apparatus comprising:
   a total reflection section comprising a material with an index of refraction less than unity at a selected wavelength of the x-ray beam, the material having a polished surface that receives and redirects the beam; and
   a multilayer section comprising alternating material layers that are spaced relative to each other such as to provide wavelength specific reflection at the selected wavelength of the x-ray beam and corresponding monochromating of the x-ray beam,
   wherein the total reflection section and the multilayer section are arranged relative to each other such that the x-ray beam encounters the polished surface of the total reflection section at an incidence angle low enough to provide total external reflection of the beam, and encounters the multilayer section at a Bragg angle that provides peak reflection of the selected wavelength, and wherein substantially all portions of the x-ray beam at the selected wavelength are redirected by both the total reflection section and the multilayer section along a predetermined path.

2. An x-ray optical apparatus according to claim 1 wherein the entire x-ray beam encounters one of the sections prior to the other.

3. An x-ray optical apparatus according to claim 2 wherein the sections are arranged in a Kirkpatrick-Baez configuration.

4. An x-ray optical apparatus according to claim 1 wherein part of the x-ray beam encounters the total reflection section prior to the multilayer section, and part of the x-ray beam encounters the multilayer section prior to the total reflection section.

5. An x-ray optical apparatus according to claim 1 wherein the optical apparatus focuses the x-ray beam.

6. An x-ray optical apparatus according to claim 1 wherein one of the sections is shaped like a side-by-side single bounce mirror, and one of the sections is shaped like a double side reflection mirror, and wherein the two sections are adjacent to each other such that the x-ray beam is reflected by each of the two sections.

7. An x-ray optical apparatus according to claim 6 wherein the relative positioning of the sections are changed in order to change a focus distance between the apparatus and a focus spot of the x-ray beam.

8. An x-ray optical apparatus according to claim 1 wherein each section has a surface with a cylindrical curvature, one of which is concave and one of which is convex, and wherein the two sections are adjacent to each other such that the x-ray beam is reflected by each of the two sections.

9. An x-ray optical apparatus according to claim 8 wherein the relative positioning of the sections are changed in order to change a focus distance between the apparatus and a focus spot of the x-ray beam.

10. An x-ray optical apparatus according to claim 1 wherein the sections are arranged in a double cross-coupled configuration in which the two sections are adjacent to each other along a primary propagation direction of the x-ray beam, and each of the sections comprises a side-by-side arrangement of reflective surfaces.

11. An x-ray optical apparatus according to claim 10 wherein the relative positioning of the sections are changed in order to change the focus distance between the apparatus and a focus spot of the x-ray beam.

12. An x-ray optical apparatus according to claim 1 wherein one of the sections encompasses the other section about an axis parallel to a primary propagation direction of the x-ray beam.

13. An x-ray optical apparatus according to claim 12 wherein the section that encompasses the other section has an inner surface with a radius, relative to the axis, that varies in a direction parallel to the axis.

14. An x-ray optical apparatus according to claim 12 wherein the section that is encompassed by the other section has an outer surface with a radius, relative to the axis, that varies in a direction parallel to the axis.

15. An x-ray optical apparatus according to claim 12 wherein the relative positioning of the sections are changed in order to change the focus distance between the apparatus and a focus spot of the x-ray beam.

16. A method of conditioning an x-ray beam, the method comprising directing the x-ray beam toward an x-ray optical apparatus having two sections, wherein a total reflection section of the apparatus comprises a material with an index of refraction less than unity at a selected wavelength of the x-ray beam, and the material has a polished surface that receives and redirects the beam, and wherein a multilayer section comprises alternating material layers that are spaced relative to each other such as to provide wavelength specific reflection at the selected wavelength of the x-ray beam and corresponding monochromating of the x-ray beam, and wherein the total reflection section and the multilayer section are arranged relative to each other such that the x-ray beam encounters the polished surface of the total reflection section at an incidence angle low enough to provide total external reflection of the beam, and encounters the multilayer section at a Bragg angle that provides peak reflection of the selected wavelength, and wherein substantially all of portions of the x-ray beam at the selected wavelength are redirected by both the total reflection section and the multilayer section along a predetermined path.

17. A method according to claim 16 wherein the entire x-ray beam is reflected by one of the sections prior to the other.

18. A method according to claim 16 wherein part of the x-ray beam encounters the total reflection section prior to the multilayer section, and part of the x-ray beam encounters the multilayer section prior to the total reflection section.

19. A method according to claim 16 further comprising focusing the x-ray beam with the optical apparatus.

20. A method according to claim 19 further comprising adjusting the focus length between the apparatus and a focus spot of the x-ray beam by adjusting the relative position of the two sections.

* * * * *